United States Patent [19]
Kunert

[11] Patent Number: 5,155,659
[45] Date of Patent: Oct. 13, 1992

[54] HAND-HELD DATA COLLECTION TERMINAL WITH BATTERY COMPARTMENT SEALING LID AND LID-TETHERING HAND STRAP

[76] Inventor: Steven R. Kunert, 5201 McGowan Dr. SE., Cedar Rapids, Iowa 52403

[21] Appl. No.: 669,424

[22] Filed: Mar. 15, 1991

[51] Int. Cl.⁵ .................. H05K 5/03; H04B 1/38; G06F 1/00
[52] U.S. Cl. .................. 361/380; 361/392; 361/395; 361/422; 455/90; 411/549; 411/552; 292/204; 364/708; 220/331; 220/346
[58] Field of Search ............. 429/96, 98, 99, 100; 455/90, 347, 351; 411/349, 549, 552; 292/204; 364/708; 220/324, 331, 346, 375; 235/10; 361/380, 390, 391, 392, 393, 394, 395, 399, 422

[56] References Cited

U.S. PATENT DOCUMENTS

| | | | |
|---|---|---|---|
| D. 255,772 | 7/1980 | Johnson et al. | 411/349 X |
| 2,305,572 | 12/1942 | Johnson | 411/549 |
| 3,636,413 | 1/1972 | Ditthardt et al. | 220/324 X |
| 3,693,089 | 9/1972 | Hutchinson et al. | 455/351 |
| 3,980,202 | 9/1976 | Manyak et al. | 220/375 X |
| 4,047,266 | 9/1977 | Bisbing | 411/349 |
| 4,225,970 | 9/1980 | Jaramillo et al. | 455/351 X |
| 4,269,908 | 5/1981 | Stemme | 429/98 |
| 4,391,461 | 7/1983 | Deibele | 292/204 |
| 4,455,523 | 6/1984 | Koenck . | |
| 4,574,285 | 3/1986 | Bascou | 361/422 X |
| 4,638,129 | 1/1987 | Partus et al. | 361/390 X |
| 4,770,586 | 9/1988 | Osterland | 411/549 X |
| 4,928,204 | 5/1990 | Wang | 361/380 X |
| 4,953,113 | 8/1990 | Chadima, Jr. et al. | 364/708 |
| 4,969,206 | 11/1990 | Desrochers | 455/351 X |
| 5,023,824 | 6/1991 | Chadima, Jr. et al. | 364/708 |

FOREIGN PATENT DOCUMENTS

| | | | |
|---|---|---|---|
| 315736 | 5/1989 | European Pat. Off. | 455/90 |
| 3704287 | 6/1988 | Fed. Rep. of Germany | 364/708 |
| 941822 | 1/1949 | France | 411/552 |
| 90/16033 | 12/1990 | PCT Int'l Appl. . | |

Primary Examiner—Leo P. Picard
Assistant Examiner—Michael W. Phillips
Attorney, Agent, or Firm—McAndrews, Held & Malloy, Ltd.

[57] ABSTRACT

A portable, hand-held data collection terminal is housed in an elongate, protective housing. A frontal surface of the housing includes a display screen and a keyboard. A battery compartment of the data collection terminal has an access opening which is covered and sealed by a lid. The resiliency of a peripheral seal of the lid also absorbes impact forces directed against the terminal. The battery compartment is closed by placing an upper end of the lid under a ledge of the housing and locking an opposite end to the housing with a detented quarter-turn lock button. Detented positions of the lock button indicate the fully locked and fully unlocked positions of the lid. A hand strap on the rear of the housing is attached to the housing and to the lid to support an operator's handgrip on the terminal and to tether the lid to the terminal when the battery compartment is opened. Two types of protectors for indicia on keyboard keys are also disclosed. One type features rigid caps with inwardly projecting ridges which dig into deformable sides of the keys. Another type protector features caps formed of pliable material with base flanges. The flanges are capatured beneath a faceplate of the housing through which the capped keys protrude.

18 Claims, 3 Drawing Sheets

HAND-HELD DATA COLLECTION TERMINAL WITH BATTERY COMPARTMENT SEALING LID AND LID-TETHERING HAND STRAP

BACKGROUND OF THE INVENTION

The invention relates generally to the field of portable data collection terminals, and more particularly to portable, hand-held data terminals of various commercial and industrial data information systems. Hand-held data collection terminals are compact, portable sensory elements of often complex data management systems of state of the art businesses.

Data collection terminals being front line elements of such data management systems, the need for the terminals to be rugged and capable of performing with reliability under various and often adverse conditions is imperative. Portability is desirably improved by providing for ready access to battery compartments. While batteries are typically rechargeable, secondary cells, under certain uses of the portable data collection terminals a downtime for recharging included battery packs is not available, and battery packs need to be exchanged and recharged externally to extend the service cycle of a certain data collection terminal. In past improvements of such data collection terminals, the interior of the terminals were sealed against external contaminants, such as water or dust, while battery packs were slidably located in semi-protected battery compartments. In some existing embodiments, part of the battery casing itself constitutes part of the protective closure of such battery compartments. In other existing embodiments, hinged end cap closures have been employed to enclose the battery within the general housing structure of the hand-held data collection terminals.

It is realized that improvements rendering the state of the art data collection terminals more rugged further increase the number of applications in which the data collection terminals can be used, and hence increase the usefulness of the terminals.

SUMMARY OF THE INVENTION

It is a therefore a general objective of this invention to provide an improved data collection terminal with increased resistance to external influences without sacrificing the accessibility to its power source and the usefulness of its keyboard.

A more particular object of the invention is to provide a data collection terminal having a battery compartment with protection against damage of the battery in a drop and with improved protection against elements.

Another object of the invention is to combine a wrist strap retaining feature of a data collection terminal with a provision against loss of a battery compartment door.

It is a further object of the invention to provide a data collection terminal with a keyboard having an extended service life over state of the art keyboard key indicia.

A portable, hand-held data collection terminal in accordance with the invention includes a sealed housing having a power compartment and an access opening to such compartment formed within the housing. The opening has a contoured ledge. A lid is of a size to cover the opening. The lid includes a peripheral sealing rim wherein a peripheral seal is retained. The contoured ledge of the opening is disposed to be engaged by the peripheral seal of the sealing rim of the lid in lateral and in perpendicular directions with respect to the general plane of the opening.

The power compartment comprises resilient contact provisions which are disposed at opposite ends in the longitudinal direction of the housing. A power pack is resiliently retained in the longitudinal direction between such resilient contact provisions. The lid provides resilient contact to the battery in directions transverse to the longitudinal direction. Thus, the resilient contact provisions and the lid form a resiliently padded seat for the power pack of the data collection terminal to retain the power pack in a position within the compartment which is protected from extreme shock due to sudden impact of the housing with a rigid surface.

According to another aspect of the invention the data collection terminal includes a hand strap attached at a top end to the housing and at a bottom end to the lid covering the opening. According to one aspect of the invention the hand strap is resilient and has an unstretched length less than the distance from its attachment at the top end of the housing to the attachment point of the seated lid at the opening. The lid includes a ledge which engages the housing in response to the resilient urging of the hand strap when the ledge engages the housing.

A latch mechanism for latching the lid in a closed position sealing the opening in the housing of the portable hand-held data terminal includes a quarter-turn lock button and a latch lever for locking and unlocking the lid in response to a respectively locking and unlocking turn of the lock button. A peripheral, resilient seal is sealingly engaged between the lid and the latch lever and is peripherally disposed about the lock button. The seal seals off a gap between the lid and the lock button. The lock button has a detenting contour with a complemental contour being disposed in the lid, for seating the button in locked and unlocked positions. The resilient seal of the latch mechanism resiliently urges the lock button into the detented positions.

The portable, hand-held data collection terminal typically includes a keyboard and a display screen for respectively providing for manual data entry, and for displaying data to an operator in a typical communications mode. According to a particular aspect of the invention transparent key caps are attached to keys protruding from a front faceplate. The key caps protect indicia displayed on upper faces of the keys from wear during manual data entry. According to a particular aspect of the invention, the keys are resilient keys of a molded keyboard key matrix and the caps are molded of a substantially rigid, transparent material and include internal ridges which become engaged with resilient sides of the keys, the engagement retaining the caps on the keys. According to another aspect of the invention each of the key caps are of flexible transparent material and include a flange about a lower rim. The flange is captured by the faceplate. The caps protrude from the faceplate externally over respective keys to cover and protect the keys.

Other features and advantages of the invention will become apparent from the detailed description of a preferred embodiment of the invention.

BRIEF DESCRIPTION OF THE DRAWINGS

The detailed description of a preferred embodiment of the invention may be best understood when read in reference to the accompanying drawings wherein.

DETAILED DESCRIPTION OF THE INVENTION

Figure 1:
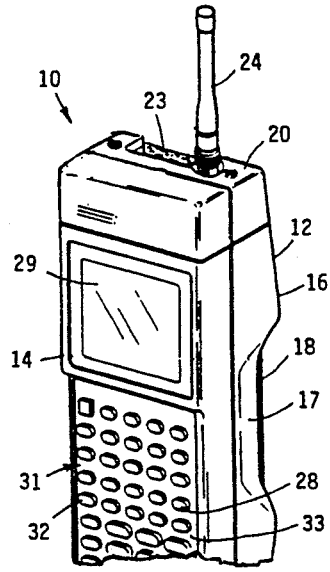
FIG. 1 shows a general pictorial representation of a portable data collection terminal which includes features as a particular embodiment of the invention.

Referring to FIG. 1, there is shown a pictorial view of a portable, hand-held data collection terminal which is designated generally by the numeral 10. The data collection terminal 10 is substantially housed in and defined in its overall rectangular, elongate shape by a plastic housing 12 of a high impact plastic. In a preferred embodiment the housing 12 is made up of an upper or frontal housing shell 14 and a rear housing shell 16. In efforts to protect the interior of the housing, namely the functional electrical and communications networks (not shown) from becoming contaminated by dust or moisture, the housing shells may be sealed in a number of ways. A preferred manner of sealingly engaging the housing shells is with matchingly grooved engaging edges, particularly with a pliable seal embedded in such grooved edges. An O-ring type seal may be embedded in such grooves. The rear housing shell 16 includes a centrally disposed, contoured hand grip portion 17 of somewhat indented configuration. An elastic hand strap 18 is stretched longitudinally across the indented portion 17 of the housing, the hand strap 18 being fastened adjacent a top end 20 and a bottom end 21 (See FIG. 2) of the housing 12. The top end 20, which may be formed as an integral part of the front and rear housing shells 14 and 16, features in a preferred embodiment a data communications connector 23, for connecting, for example a code reader (not shown) or other data collection accessory, as may be desirable. The top end 20 further shows an antenna 24, as an external element of a preferred wireless communications transceiver, such as a radio frequency transceiver, otherwise disposed within the housing 12 of the data collection terminal 10.

The frontal or front shell 14 of the housing 12 features desirably an alphanumeric keyboard 28, and a display screen 29. The display screen is preferably a multi-line and multi-character liquid crystal display ("LCD") with an active array of, for example, 128×128 pixels. The keyboard 28 in the preferred embodiment uses a molded key matrix 31 of flexible keys, such as representative key 32, disposed behind and protruding through a correspondingly apertured faceplate 33 of the front shell 14 of the housing 12.

Figure 2:
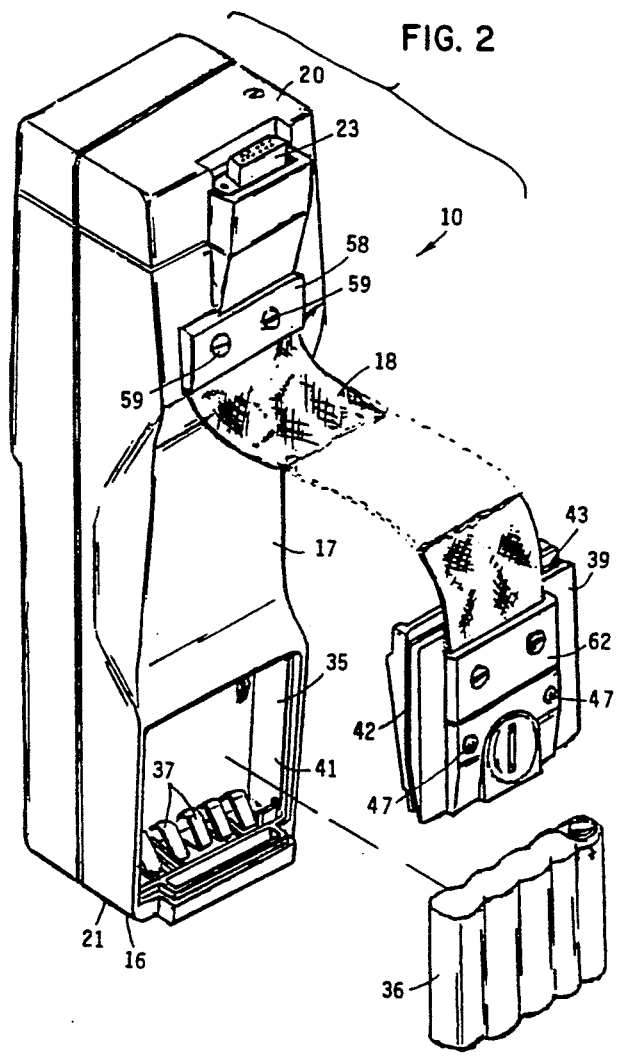
FIG. 2 is a more detailed and partially exploded view of the data collection terminal shown in FIG. 1, showing features of the invention in greater detail.

FIG. 2 shows the data collection terminal 10 in a view highlighting the rear shell 16 and particular features associated therewith. Adjacent the bottom end 21, a compartment 35 is disposed and is of a size to receive a power pack or battery pack 36, as a portable power source 36 of the data collection terminal 10. Preferably, the portable power source 36 is a rechargeable battery, such as a nickel cadmium technology battery, however non-rechargeable batteries packs may also be used, as long as the configuration of the battery pack matches that of the preferred rechargeable battery pack 36. The battery pack 36 may be keyed, such as in an offset contact arrangement, to prevent contact from being made to wrong ones of active spring contacts 37 when the battery is accidentally inverted during its insertion into the battery compartment 35. The battery compartment 35 features a plurality of the spring contacts 37 between which the battery pack 36 is retained. Only one selected one of the contacts 37 of each polarity is preferably electrically coupled to electric circuits of the data collection terminal 10.

A cover or lid 39 is configured to match an opening 41 of the battery compartment 35. The lid 39 includes a peripheral contoured and recessed sealing rim 42 adapted to receive and retain a seal, such as an O-ring seal 43 shown in the preferred embodiment. The opening 41 in the housing 12 follows the contour of the housing and has a generally planar extent adjacent the bottom end 21. The contour of the sealing rim 42 is matched to the contour of a sealing ledge 44 which is formed in the housing 12, defining the periphery of the opening 41. In contrast to other well known sealing applications in the art, the sealing ledge 44 is effectively sloped with respect to the generally planar extent of the adjacent O-ring 43 of the sealing rim 42. The O-ring 43 consequently engages the sealing ledge 44 along the periphery of the opening 41 laterally and perpendicularly to the general plane of the opening 41. The lid 39 includes a latch assembly 45, externally recessed within the lid 39 and including a recessed "coin slot" lock button 46. A "coin slot" is a slot that is known in the art, in that it permits a recessed button to be engageable with a tool to be turned. In the absence of a specific tool for turning the respective actuator about a central axis, a common coin may be used as a tool. A quarter turn of the lock button 46 moves the latch 45 between latched and unlatched positions. In the preferred, illustrated embodiment of the invention, the lid may include external indentations 47 which serve as detent seats for seating the data collection terminal 10 in a holder (not shown) which may be used for temporary storage, battery charging operations or data transfer and communications operations.

Figure 4:
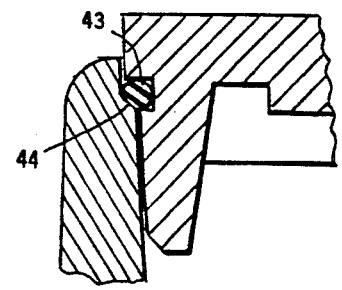
FIG. 4 is an enlarged partially sectioned view of a lid of the battery compartment closure, showing particularly a sealing arrangement in accordance with the present invention.
Figure 5:
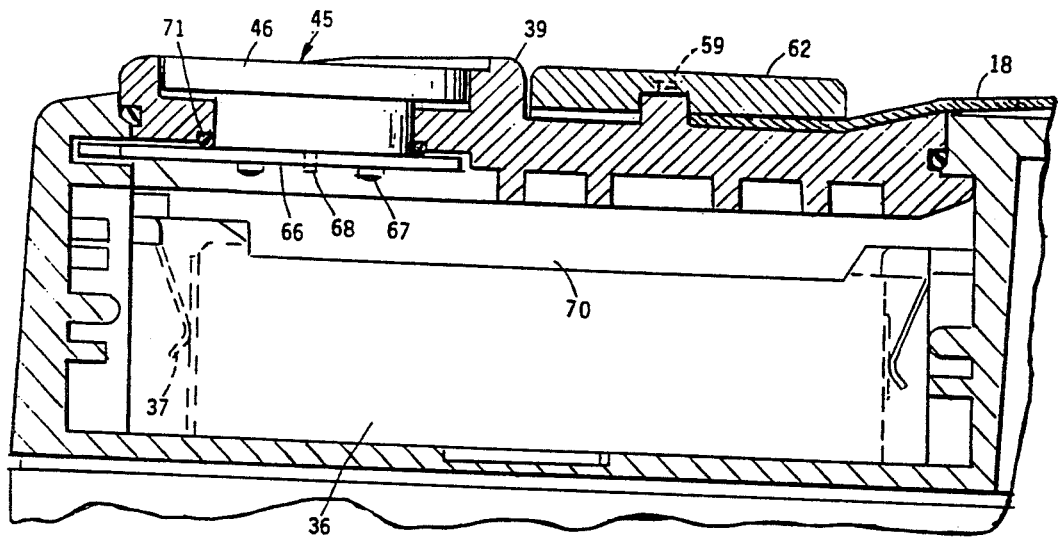
FIG. 5 is an enlarged sectional view through the battery compartment of the data collection terminal shown in FIG. 1.

When the lid 39 is placed in position within the opening 41 of the battery compartment 35, closing off the opening 41, and when the lid is latched by the latch assembly 45, such as is shown in the sectional view of FIG. 5, the O-ring seal 43 is effectively sealing the battery compartment 35. Harmful contaminants, such as dust and moisture, will be kept out of the battery compartment, even when the data collection terminal 10 is operated under conditions subjected to weather or in a dusty warehouse. A combination of dust and moisture may not only cause corrosion of contacts, but may possibly short out electrical contacts within the battery compartment. In addition, it has been found that the resilient seal provided by the O-ring 43 tends to absorb and lessen a sudden shock that is otherwise transmitted to the battery pack 36, to possibly damage the battery pack. Because of the resilient mount of the lid 39, the lid 39 may rest against the rearward facing surface 48 of the battery pack 36, resiliently constraining the battery pack in the front-to-rear direction within the battery compartment 35. A particular detail of the O-ring seal 43 is shown in the partial sectional view of FIG. 4. The typical angular engagement of the sealing ledge 44 with the O-ring 43 provides a front-to-rear (perpendicular to the general plane of the opening 41) as well as a lateral shock absorbing engagement between the lid 39 and the rear shell 16 of the housing 12. The packaging afforded by the battery compartment lid 39 consequently tends to increase the shock resistance offered by the housing 12 to the portable power source 36 of the data collection terminal 10.

Figure 3:
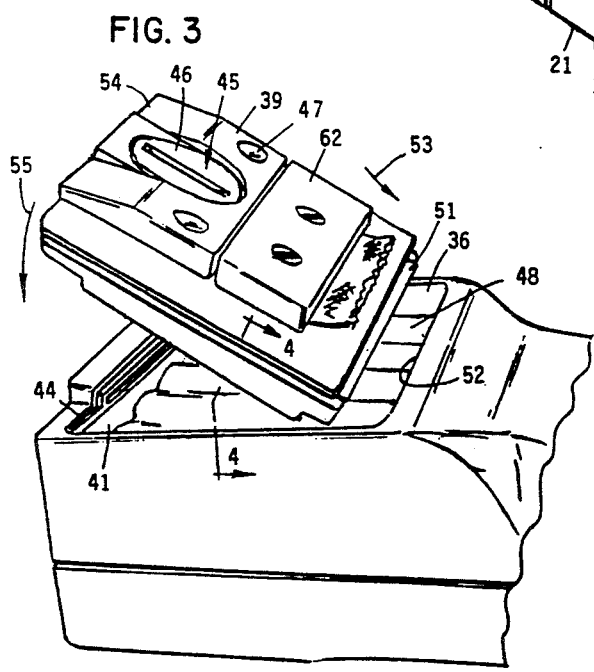
FIG. 3 is a pictorial representation of a lower portion of the data collection terminal of FIG. 1, showing the battery compartment and particular details of a closure of the battery compartment in accordance with features of the present invention.

An upper portion of the rim 42 which faces toward the top end 20 of the housing 12 includes an upward facing, protruding ledge 51 which extends past the sealing rim 42. The upper end of the opening 41 in the housing 12 includes an undercut seating ledge 52 to provided a retaining hold for the lid 39 toward the top end 20 of the housing 12. The lid 39 is positioned to close the battery compartment 35 by inserting the upper ledge 51 of the lid 39 under the corresponding seating ledge 52 in the direction indicated by arrow 53 and then pushing a bottom end 54 of the lid 39 toward the opening 41 as shown by arrow 55. Another advantageous structure of the lid 39 in its combination with the housing 12 is best explained in further reference to FIGS. 2 and 3. The hand strap 18 is attached to the top end of the rear housing shell 16 with a clamping bracket 58, which preferably may be clamped down by screws 59. A lower end 61 of the hand strap 18 is attached by a clamping bracket 62 and similar screws 59 to the lid 39. The unstretched length of the resilient hand strap 18 is chosen to have an installed stretch of, for example, ten percent of its unstretched length. A convenient amount of stretching, depends of course on the material used and the desired amount of pre-tension. Thus, with any amount of resilient stretch established in the installed hand strap 18, the hand strap needs to be stretched somewhat to allow the ledge 51 to be inserted under the corresponding housing ledge 52. The resilient yield or initial stretch in the hand strap 18 becomes established, when the lid 39 is then pushed into the closed position in the direction of the arrow 55, as previously described. The hand strap may be used for grasping the lid 39 when it is desired to open the battery compartment 35 and replace the battery pack 36, for example. Furthermore, while the lid 39 is removed from the opening, there is no need to hold on to the lid 39 or to place it in a secure location. The lid remains tethered to the rear housing shell 16 by the hand strap 18. The hand strap 18 and its attachment to the lid 39 as described, consequently, facilitate the removal, the retention while being removed and the replacement of the lid.

FIG. 5 shows the battery pack 36 inserted within the battery compartment 35. The lock button 46 extends substantially through the lid 39 and a latch lever 66 abutting an innermost end of the lock button 46 is preferably attached to the lock button 46 with threaded fasteners 67. Also, it has been found advantageous to provide a locating pin 68 for orienting the latch lever 66 with respect to the angular orientation of the lock button 46, and to prevent inadvertent reversal of the latch lever with respect to the lock button 46. The locating pin 68 consequently functions as a key to prevent such inadvertent reversal. The lid 39 is locked into place, the latch assembly 45 having been locked by a quarter turn of the lock button 46 as indicated, for example, by arrow 69 in FIG. 6. Further in reference to FIG. 5, the lid 39 may have a depth to engage the adjacent surface of the battery pack 36 in direct contact, or a spacer member 70 may be interposed between the lid 39 and the battery pack 36. The spacer member 70 may be of resilient material, further absorbing shock such as may be sustained by accidental impact of the data collection terminal 10 against a solid surface. In the alternative, a contacting spacer member 70 may be shielded from severe impact forces by the resiliently mounted lid 39. Since the lid 39 is resiliently held within the opening 41 by the engagement of the O-ring 43 with the ledge 44 of the housing 12, the battery pack 36 may be restricted from lateral movement with respect to the longitudinal extent of the housing 12 as well as in a direction perpendicular to the opening 41.

Figure 6:
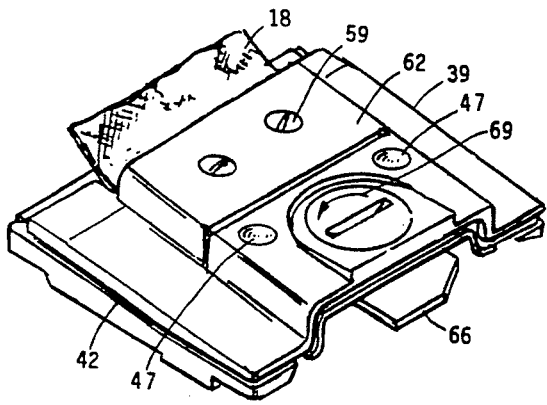
FIG. 6 is another pictorial view of the battery compartment lid of the data collection terminal of FIG. 1.
Figure 7:
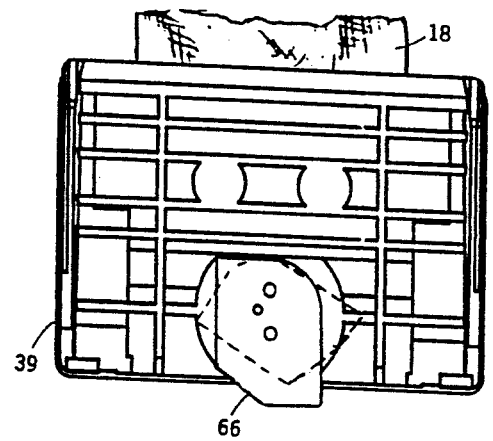
FIG. 7 shows details of the underside of the lid shown in FIG. 6, showing particular details of the closure mechanism.
Figure 8:
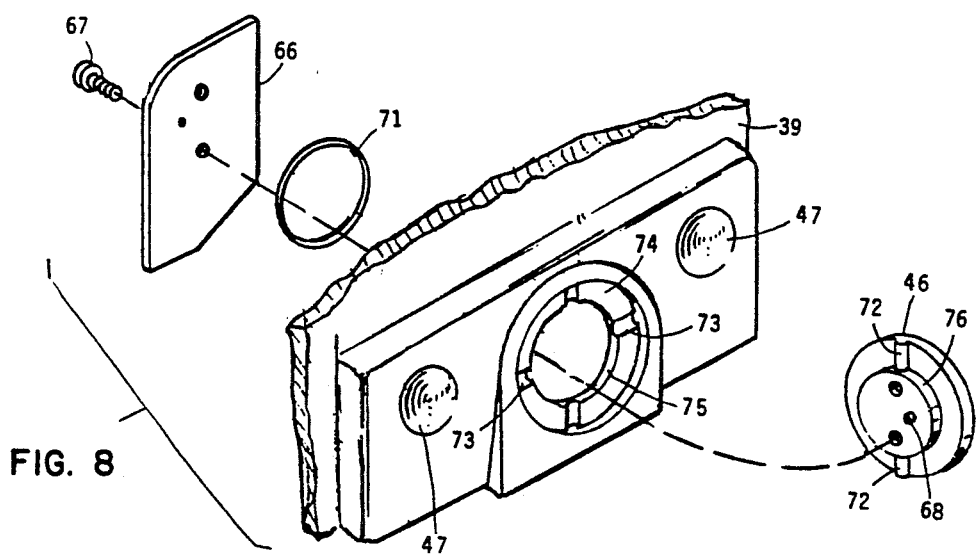
FIG. 8 is a partial, exploded pictorial view, showing a detenting mechanism of a latch of the lid of the battery compartment.

A particular advantage of the latch assembly 45 is described in greater detail in reference to FIGS. 6, 7 and 8 in addition to FIG. 5. The exploded view of the latch assembly 45 shows an O-ring 71 which seats about the lower periphery of the lock button 46. A primary function of the O-ring 71 is of course to seal the peripheral opening between the lid 39 and the lock button 46 in support of achieving a substantially sealed battery compartment 35. However, the underside of the lock button 72 features protrusions 72 which are disposed to engage correspondingly located indentations 73 in a molded recess 74 circumferentially disposed about an inner aperture 75 through the lid 39. The innermost cylindrical extension 76 of the lock button 46 extends through the aperture 75 to accept the sealing O-ring 71 at its innermost end. The O-ring 71 may be captured between the adjacent surfaces of the lid 39 and the latch lever 66, or may become seated within a shallow recess disposed in the lid 39 circumferentially about the aperture 75. The O-ring 71 when mounted as described has been found to serve an additional function in addition to the described sealing function. The resiliency of the O-ring has been found to advantageously provide a spring force to activate the detenting action between the protrusions 72 and the corresponding indentations 73. If the depth of the indentations 73 is at least equal to the height of the protrusions 72, the height of the protrusions 72 determines an outward or axial movement of the lock button 46 when the lock button is initially moved from its detented position. If the indentations 73 are less than the height of the corresponding protrusions 72, the depth of the indentations determines axial movement of the lock button 46, and hence the amount of compression of the O-ring. The compression of the O-ring 71 is selected, such that at least some compression remains, as for example ten percent when the lock button 46 has moved to its detented position. From the above description it should be understood that the described embodiment using two protrusions and correspondingly four indentations at right angles are preferred because of the preferred quarter-turn of the lock button 46 to move the assembly 45 between latched and unlatched positions. Other angular detent limits could be employed if correspondingly more or less angular movement of the look button 46 between latched and unlatched positions were provided. Also, as an alternative, the locations of the protrusions 72 and corresponding indentations 73 could be reversed, such that the lock button 46 might feature the indentations in the peripheral flange area about the central body 76, and the corresponding protrusions would be located in the recessed peripheral area 74 of the lid 39. The detenting function of the latch assembly 45 provides added safety against the lid 39 from inadvertently becoming unlatched and opening while the data collection terminal 10 is being operated.

Figure 9:
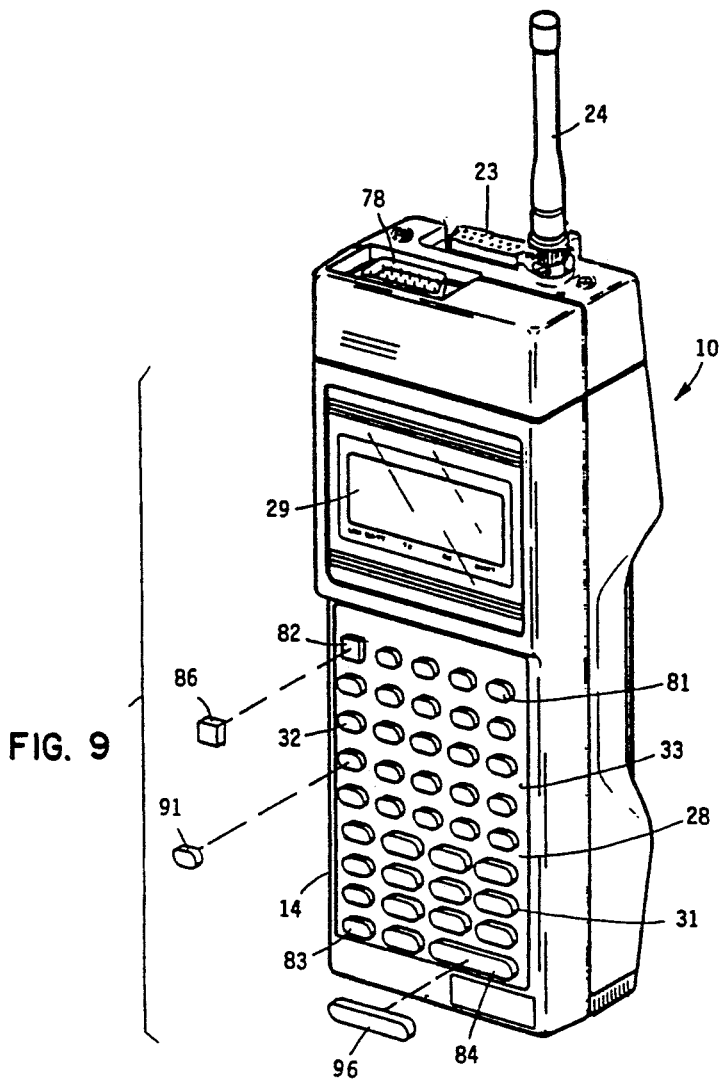
FIG. 9 is a pictorial view of another embodiment of a data collection terminal, showing features of a keyboard in accordance with the present invention in greater detail.

In reference to FIG. 9, the data collection terminal 10 is substantially identical to the data collection terminal depicted in FIG. 1. FIG. 9 illustrates a further connector 78 which may be added as an additional data communications port to the already described connector 23 disposed in the top end 20 of the data collection terminal 10. Other changes, of course, are possible with respect to various input and output means without effect on the scope of the invention. However, in further improving the ruggedness of the data collection terminal 10, a particular improvement relating to the keyboard has been found to advantageous affect the service life of the keyboard 28. It has been found that available keyboard matrices, such as the preferred matrix 31 disposed behind the faceplate, are desirably of soft material. Though the soft keys, such as keys 32, protruding through the faceplate 33 are advantageous in use and resistant against breakage, it has been found that indicia appearing on the top of such keys are subject to wear and become rather soon illegible. A trained operator will quickly learn the relative position of the keys in the matrix 31, thus be able to possibly operate the keyboard without reference to the indicia of each of the keys. However, because of typical operator changes, the individual keys need to be identified to allow the safe usage of the keyboards 28.

Figure 10:
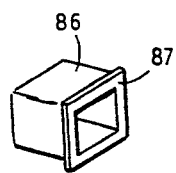
FIGS. 10 through 15 show various key protector caps as embodiments of certain features of the present invention.

The proper identification of each key, such as the representative key 32, is particularly important in that the keyboard is a significant operator to system interface. In reference to FIG. 9, and further in reference to details depicted in FIGS. 10 through 15, caps, such as indicated at 86, 91 and 96 as particular examples in accordance with the invention, may be employed in conjunction with a keyboard, such as the keyboard 28, to extend the service life of its keys. Preferred caps 86, 91 and 96 would desirably be of a substantially transparent plastic material, thereby protecting the indicia on the keys 32 without significantly reducing their visual identification. FIGS. 10, 12 and 14 show embodiments of differently shaped caps, designated correspondingly by numerals 86, 91 and 96. The shapes of the caps 86, 91 and 96 are chosen complementary to the shape of corresponding keys 32 protruding from the faceplate 33 in FIG. 9. During the assembly of the data collection terminal 10, the caps 86, 91 and 96 are placed over correspondingly shaped ones of the keys 32 of the keyboard 28, before the matrix 31 is placed behind the faceplate 33. Flanges 87, 92 and 97 which extend like hat rims about lower openings of the respective caps become disposed about a perimeter of a respective key opening in the faceplate 33. The assembly of the matrix 31 within the front housing shell 14 captures the respective flanges 87, 92 and 97 and retains the caps over their respective keys 32. Because the flanged caps are held in place by the captured respective flanges, the flanged caps may be of a resiliently pliable or flexible plastic material.

Figure 11:
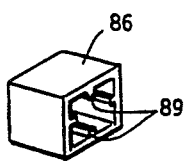
Figure 12:
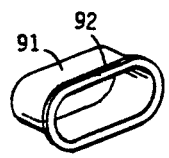
Figure 13:
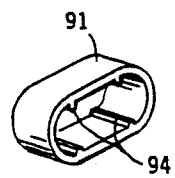
Figure 14:
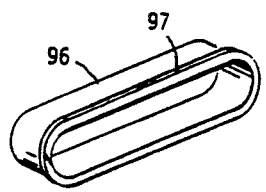
Figure 15:
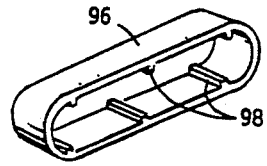

Alternative embodiments of the key caps 86, 91 and 96 are shown in FIGS. 11, 13 and 15, respectively. Instead of a flexible of pliable material, the caps are molded of substantially rigid, though also transparent, plastic material. The caps shown in FIGS. 9, 11, 13 and 15 would have an internal depth that is less than the internal depth of the flanged caps, though the upper thickness of material may substantially raise the height of the caps. The desired depth of the caps should of course be less than the height to which the keys 32 extend above the faceplate 33. The substantially rigid caps 81, 86 and 91 are in this alternate embodiment provided with internal protrusions 89, 94 and 98, respectively. The protrusions are shaped to laterally engage the comparatively soft and pliable sides of the protruding keys 32 to adhere thereto. The protrusions may be molded ridges 89, 94 and 98, as shown. Other configurations such as dot-like internal protrusions may be provided by a more complex molding process than that for the ridges 89, 94 and 98.

Having described the invention with respect to a particular embodiment thereof, it should be understood that various changes and modifications in the structure of the described embodiment are possible without departing from the spirit and scope of the invention as set forth in the claims.

What is claimed is:

1. A portable data collection terminal comprising:
   an elongate, sealed housing of substantially rectangular shape between respective top and bottom ends of the housing, the housing having front and rear portions, the front portion having an operator accessible frontal surface including a keyboard and a display screen for operator interaction therewith;
   a power compartment disposed within the sealed housing, the power compartment having an access opening following the contour of the housing and having a generally planar extent, the opening terminating in a peripheral, contoured ledge defined in the rear portion of the housing;
   a lid of a size covering the power compartment opening, the lid having a peripheral rim and a peripheral seal retained by the rim;
   the contoured ledge being disposed with respect to the peripheral seal when the lid is positioned to cover the opening, sealingly engaging the lid seal in lateral and perpendicular directions with respect to the general extent of the opening within the housing;
   means latching the lid within the opening, whereby, when the lid is latched within the opening, the opening becomes substantially sealed against access by external contaminants; and
   a hand strap of resiliently stretchable material disposed along the rear portion of the housing, the hand strap being attached at one end adjacent the top end of the housing and at a second end to the lid, whereby the lid upon being removed from the opening of the power compartment remains tethered to the housing by the strap.

2. The data collection terminal according to claim 1, wherein the power compartment comprises means resiliently contacting and retaining a power pack and means positioning the power pack within the compartment in resilient communication with the lid retaining the power pack in a direction perpendicular to the general extent of the lid, the peripheral seal resiliently absorbing extreme impact forces which may otherwise be directed against the power pack.

3. The data collection terminal according to claim 1, wherein the lid includes a protruding ledge adjacent an upper rim portion facing toward the top end of the housing and extending past the sealing rim toward said top end, and wherein the housing includes a complementary, undercut ledge retaining the protruding ledge adjacent the upper rim portion, the latching means being disposed opposite the ledge of the lid.

4. The data collection terminal according to claim 1, wherein the means latching the lid within the opening comprises a lock button disposed in a recess of the lid adjacent one edge thereof, the lock button having an inner cylinder extending through the lid, a latch lever mounted to the inner cylinder adjacent an inner wall of the lid, and a resiliently compressible seal disposed about the inner cylinder and in compressible relationship between adjacent surfaces of the latch lever and the lid, the lock button having detenting means defining perceivable angular positions of the lock button corresponding to latched and unlatched positions of the latch lever.

5. The data collection terminal according to claim 3, wherein the lock button includes a slot disposed in an outward facing surface and accessible for engagement with a tool, and respective latched and unlatched positions of the latch lever require less than a single revolution of the lock button, the resilient compression force of the seal disposed about the inner cylinder of the lock button providing an axial urging force on the lock button, the axial urging force urging the lock button into respective detent positions of the detenting means.

6. The data collection terminal according to claim 5, wherein the detenting positions are defined by protrusions disposed on an inward facing surface of the lock button and by correspondingly spaced recesses in an outward facing surface of the lid.

7. A portable data collection terminal comprising:
an elongate, sealed housing of substantially rectangular shape and having longitudinally opposite top and bottom ends, the housing having a frontal and rear housing portions, the frontal housing portion including a keyboard and a display screen accessible to an operator for interaction therewith;
a power compartment disposed adjacent the bottom end of the housing and having an access opening in the rear housing portion adjacent the bottom end of the housing, the opening having an undercut ledge along one edge thereof and having a sealing ledge extending peripherally about the opening, the sealing ledge being sloped with respect to the planar extent of the opening; and
a lid of a size and configuration corresponding to the opening of the power compartment, the lid having a rim including a peripheral recess, a peripheral seal retained by the recess, the seal complementarily engaging the sloped sealing ledge of the access opening upon insertion of the lid into the access opening, the lid further having a protruding ledge along one edge thereof, the protruding ledge extending beyond the rim of the lid and insertible under the undercut ledge of the access opening upon insertion of the lid into the access opening, and a latch means disposed in the lid at an edge opposite the edge having the protruding ledge, the latch means locking the inserted lid within the access opening to retain the seal engaged with the sloped sealing ledge of the access opening, the sloped sealing ledge of the access opening seatingly locating the seal of the lid in the lateral and vertical directions with respect to the general extent of the access opening and the lid.

8. The data collection terminal according to claim 7, the undercut ledge of the access opening being disposed along an upper edge of the access opening toward the top end of the housing, the protruding ledge being disposed adjacent a corresponding upper portion of the rim of the lid and the latch means being disposed adjacent the bottom end of the housing.

9. The data collection terminal according to claim 13, further comprising a hand strap of resiliently stretchable material, the hand strap being attached at one end adjacent the top end of the housing and at an opposite end adjacent the upper rim portion of the lid, the hand strap having an unstretched length less than the distance between its attachment at said one end adjacent the top end of the housing and a location of the attachment of the opposite end when the lid is positioned within the opening of the housing, whereby the hand strap is subjected to a predetermined amount of stretch when the lid is positioned within the opening and, upon being removed from the opening, remains tethered to the housing by the strap.

10. The data collection terminal according to claim 7, wherein the lid comprises an aperture adjacent the edge opposite the edge having the protruding ledge, a recess disposed circumferentially about the aperture, the latch means comprising a lock button seated within the recess about the aperture, the lock button having a cylindrical extension extending through the aperture and receiving peripherally a resilient ring, and a latch lever abutting an inner end surface of the cylindrical extension, the resilient ring being captured between an inner portion of the lid and the latch lever, thereby sealing a space between the cylindrical extension of the lock button and the lid, the resilient ring being resiliently compressible to permit axial movement of the lock button axially of the cylindrical extension, and complementary detent features, disposed on the surface of the recess about the aperture and on an underside of the lock button facing the recess about the aperture, the detent features detenting the lock button in first and second rotational positions.

11. The data collection terminal according to claim 7, wherein the lid comprises an aperture adjacent one edge thereof, an annular recess disposed about the aperture, and wherein the latching means comprises a lock button disposed within the annular recess, the lock button having an inner cylinder extending through the lid, a latch lever mounted to the inner cylinder adjacent an inner wall of the lid, and a resiliently compressible seal disposed about the inner cylinder and in compressible relationship between adjacent surfaces of the latch lever and the lid, the lock button having detenting means defining perceivable angular positions of the lock button corresponding to latched and unlatched positions of the latch lever.

12. The data collection terminal according to claim 11, wherein the lock button includes a slot disposed in an outward facing surface, the slot engageable to rotate the lock button between the latched and unlatched positions, the rotational movement between the latched and unlatched positions of the latch lever requiring less than a single revolution of the lock button, the resilient compression force of the seal disposed about the inner cylinder of the lock button providing an axial urging force on the lock button, the axial urging force urging the lock button into detent positions of the detenting means at the latched and unlatched positions of the latch lever.

13. The data collection terminal according to claim 12, wherein the detenting positions are defined by four protrusions disposed circumferentially at right angles on an inward facing surface of the lock button and by correspondingly spaced four indentations in an outward facing surface of the lid, the protrusions and corresponding indentations defining the latched and unlatched positions as being spaced one-quarter turn of the lock button.

14. The data collection terminal according to claim 7, wherein a hand strap attached is attached at one end adjacent the top end of the housing, the hand strap extending longitudinally along the rear housing portion and being attached at a second end to the lid, the lid remaining tethered to the housing by the strap upon being removed from the housing.

15. The data collection terminal according to claim 14, the hand strap being of resiliently stretchable material and of an unstretched length less, by a predetermined amount, than the distance between its attachment at said one end adjacent the top end of the housing and at the other end to the lid when the lid is positioned and latched within the access opening of the housing, whereby the hand strap is subjected to a predetermined amount of stretch, when the lid is positioned within the access opening.

16. A portable data collection terminal comprising:
a housing having top and bottom ends and a frontal and rear housing portion, the frontal housing portion having a keyboard and a display accessible to an operator;
a power compartment disposed at one end of the housing, the power compartment having an access opening, the access opening having a sealing ledge defined by a surface having a slope with respect to the plane in which the opening extends, the housing having a receiving ledge on an inner surface of the housing adjacent one edge of the access opening;
a lid of a size to fit the opening, the lid having a rim including a peripheral recess retaining an O-ring seal, the seal being disposed to engage the slope of the sealing ledge of the access opening when the lid is disposed within the access opening; the lid comprising a protruding ledge disposed to engage the receiving ledge of the housing upon the lid being inserted into the opening of the housing, the protruding ledge retaining one end of the lid with respect to the housing, and latch means disposed at an opposite end of the housing, the latch means latching the lid within the opening and urging the O-ring into engagement with the sloped surface of the sealing ledge, the engaging contact locating the lid resiliently in the vertical and horizontal directions with respect to the housing; and
a hand strap attached at one end to the housing and at the other end to the lid to tether the lid to the housing when the lid is removed from the opening.

17. The data collection terminal according to claim 16, wherein the lid includes an aperture and a peripheral recess receiving the latch means, the latch means comprising a quarter-turn fastener, the fastener comprising a lock button disposed within the recess of the lid, the lock button having a cylindrical extension extending through the aperture of the lid, a latch lever attached to an inner end of the cylindrical extension, and a resilient member disposed about the cylindrical extension and restrained between an inner surface of the lid and the latch lever, the resilient member sealing a peripheral gap between the cylindrical extension of the lock button and the aperture of the lid and resiliently yielding in response to movement of the lock button axially of the cylindrical extension, and detent provisions disposed in respectively facing surfaces of the lock button and the recess in the lid, the detent provisions being disposed peripherally about the aperture in the lid and spaced at right angles, thereby providing detenting actions in both a latched and an unlatched position of the quarter turn fastener.

18. The data collection terminal according to claim 16, wherein the power compartment is disposed adjacent the bottom end of the housing, the access opening is disposed in the rear portion of the housing, the receiving ledge of the power compartment is disposed toward the top end of the housing, the hand strap is attached at the one end adjacent the top end of the housing and extends longitudinally adjacent the rear portion of the housing to the lid with the lid is disposed within the access opening, the hand strap being of resilient material and being of a length which is shorter than the distance between the attachment of the strap to the housing and to the lid when the lid is disposed within the access opening, the hand strap being resilient stretched by the insertion of the protruding ledge beneath the receiving ledge of the lid and the retention of the lid within the access opening by the latch means disposed opposite the protruding ledge.

* * * * *